United States Patent Office 2,768,992
Patented Oct. 30, 1956

2,768,992

HARDENABLE, FLUID COMPOSITIONS CONTAINING RESINOUS POLYMERIC EPOXIDES AND A BENTONITE-AMINE REACTION PRODUCT

Florian J. Zukas, Pittsburgh, Pa., assignor to Westinghouse Electric Corporation, East Pittsburgh, Pa., a corporation of Pennsylvania No Drawing. Application September 28, 1954, Serial No. 458,988

9 Claims. (Cl. 260—37)

The present invention relates to hardenable, fluid resinous compositions and has particular reference to compositions containing normally liquid resinous polymeric epoxides adapted to be cured homogeneously to a solid state without undergoing substantial volume shrinkage.

Heretofore, resinous polymeric epoxides have been used as insulation on electrical apparatus of various kinds. The normally liquid epoxide materials, when converted to a solid state by heating the same in the presence of a catalyst, have been found to be valuable insulating materials since they have a high dielectric strength, high thermal stability, and undergo little, if any, decomposition even during the high temperatures frequently encountered in the service of such apparatus.

There are a relatively large number of known catalytic materials which will aid in converting liquid resinous reactive polymeric epoxides to a solid state. One material, dicyandiamide, is a particularly well suited catalyst for this purpose because mixtures of dicyandiamide and an epoxide have a relatively long shelf-life, that is, they will remain liquid at room temperature for a relatively long period of time. The liquid mixtures will not become solid until heated. Many other catalytic materials which it would be desirable to use, although they may not form mixtures having as long a shelf life as dicyandiamide, have not been used widely primarily because of their insolubility in the epoxides. In those instances where insoluble catalysts have been used it has been necessary to mechanically admix the finely divided insoluble catalytic material with the epoxide thoroughly in order to obtain a uniform dispersion of the catalyst throughout the epoxide. Such dispersions are not stable, however, and a portion of the insoluble material settles out readily so that on subsequent heating there frequently results a heterogeneous or incomplete cure to the extent that the upper portion of thick sections or castings may not be cured at all. Furthermore, in those instances where complete cures have been obtained, the composition frequently has shrunk in volume and pulled away from the walls of the apparatus to which it has been applied to such an extent that its usefulness as an insulating material is materially reduced.

The object of the present invention is to provide hardenable, fluid compositions comprising a resinous polymeric epoxide, a catalyst, and a stabilizing additive adapted to be cured completely in any thickness to a solid homogeneous state without undergoing substantially any volume shrinkage.

Another object of the invention is to provide electrical apparatus provided with a hardenable, fluid insulating composition comprising a resinous polymeric epoxide, a catalyst, and a stabilizing additive which, upon curing to a solid homogeneous state, is free from shrinkage defects.

Still another object of the invention is to provide processes for preparing such hardenable compositions.

Other and further objects of the invention will, in part, be obvious and will, in part, appear hereinafter.

It has been discovered that the foregoing objects are attained if, when converting a fluid resinous composition comprising a resinous polymeric epoxide to a solid state by heating the same in the presence of an insoluble catalyst therefor, the conversion is carried out in the presence of a bentonite-amine reaction product.

Broadly, in accordance with the present invention, there are provided hardenable, fluid resinous compositions comprising a normally liquid resinous polymeric epoxide, catalytic amounts of an insoluble catalyst therefor, and a bentonite-amine reaction product in an amount sufficient to maintain the catalyst in stable suspension in the epoxide whereby the composition may be converted to a solid homogeneous state without undergoing substantial volume shrinkage.

The bentonite-amine reaction product serves to maintain the insoluble catalytic materials in stable suspension in the liquid epoxide. Appreciable quantities of the catalyst do not settle out as they would do in the absence of the bentonite-amine reaction product. In accordance with the present invention, the catalyst remains suspended throughout the epoxide whereby even thick sections undergo a complete cure to a solid state without undergoing substantially any volume shrinkage.

The bentonite-amine base reaction products employed in this invention are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophilic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts usable in the practice of the invention are salts of aliphatic, cyclic, aromatic, and heterocyclic amines; primary, secondary, tertiary and polyamines; quaternary ammonium compounds, as well as other monovalent or polyvalent onium compounds.

In practicing this invention, aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desirable to react the amine salt with the bentonite in the approximate ratio of 100 milliequivalents of amine salt to 100 grams of bentonite. Reaction products produced within this ratio give the maximum swelling as tested in nitrobenzene.

It will be understood that when reference is made to basic organic onium compounds such as amines it is implied that before reacting with the clay by base-exchange the amine is converted to the onium form either by the addition of acid or by reason of the fact that some part of the inorganic base in the naturally occurring clay consists of hydrogen.

An example of the preparation of a suitable bentonite-amine reaction product, hereinafter designated as "D," is as follows:

One thousand grams of a Wyoming bentonite is dispersed in 25.45 liters of water, and the slurry formed is allowed to stand for two hours to settle out the non-clay impurities. In a separate vessel, 54.37 grams of glacial acetic acid is added to 240 grams of octadecyl amine, and the amine salt is then dissolved in 1.45 liters of warm water. Upon addition of the amine salt solution to the dispersed bentonite flocculation occurs and the precipitate, after being filtered, washed, dried and pulverized constitutes the bentonite-organic base reaction product.

Other examples of suitable onium compounds and processes indicating how a bentonite-organic base reaction product may be prepared are found in U. S. Patent No. 2,531,440 to Jordan, issued November 28, 1950, and in U. S. Patent No. 2,531,427 to Hauser, issued November 28, 1950. One or more of the bentonite-amine reaction products may be employed in the compositions of the invention. The bentonite-amine reaction product is used in minor amounts, for example, in a quantity amounting to from 0.1% to 15% by weight and preferably in an amount within the range of from 0.5% to 5% by weight for each 100 parts of resin.

The resinous polymeric epoxides, also known as glycidyl polyethers, employed in accordance with the present invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethylmethane (referred to hereinafter as bis-phenol "A"), and 4,4'-dihydroxy-diphenyl-methane. In admixture with the named polynuclear phenols, use also may be made of those polynuclear phenols wherein the phenol nuclei are joined by sulfur bridges, such as for example as 4,4'-dihydroxy-diphenyl-sulfone.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, usch as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0. By epoxy equivalency reference is made to the average number of 1,2-epoxy groups

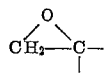

contained in the average molecule of the glycidal ether. Owing to the method of preparation of the glycidal polyethers and the fact that they are ordinarily a mixture of chemical compounds having somewhat different molecular weights and contain some compounds wherein the terminal glycidal radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

Resinous polymeric epoxides or glycidyl polyethers suitable for use in accordance with this invention may be prepared by admixing and reacting from one to two mol proportions of epihalohydrin, preferably chlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed first and then the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

While catalysts which are soluble in the resinous polymeric epoxide may be used, this invention is particularly adapted to the use of catalytic materials which are insoluble or only slightly soluble in the resinous polymeric epoxide at temperatures of about 25° C. to 30° C. Examples of suitable catalytic materials include dicyandiamide; triethanolamine borate; m-phenylenediamine; diphenylamine; melamine; quinoline; hexamethylene tetramine; urea and substituted ureas such as alkyl ureas having from 1 to 5 carbon atoms in each alkyl radical of which there may be from 1 to 4 attached to the nitrogen atoms, for instance, tetraethyl urea; guanidine and substituted guanidines having from 1 to 5 carbon atoms in each alkyl radical of which there may be from 1 to 4 attached to the nitrogen atoms of the amine groups, such as, symmetrical dibutyl guanidine; and acids such as maleic acid, fumaric acid, citraconic acid, phthalic acid and anhydrides thereof, if any.

The catalytic materials may be used singly or in any proper admixture of two or more and are employed in amounts within the range of from 6% to 50% by weight for each 100 parts by weight of the epoxide.

If desired, inert finely divided fillers may be employed in the compositions of the present invention. Examples of suitable filler materials include calcium carbonate, iron oxide, titanium dioxide, kaolin, wood flour, silica flour, finely divided mica, asbestos fibers, chopped glass fibers and alumina. The inert finely divided fillers may be employed in a relatively large proportion, for example, in amounts up to 300 parts by weight of filler for each 100 parts by weight of epoxide resin.

The order in which the various ingredients are admixed in formulating the hardenable, fluid compositions of the present invention is not critical. One convenient method for formulating the compositions comprises admixing the bentonite-amine reaction product and catalyst with about 20% by weight of the resinous polymeric epoxide and passing the mixture through a three-roll paint mill until the mixture is of a smooth consistency. About three to four passes through the paint mill generally provides a homogeneous product having a satisfactory consistency. The remainder of the resinous polymeric epoxide then is added to the homogeneous mixture and the resultant mass is stirred until a completely homogeneous composition of a liquid to pasty consistency is obtained. The resulting composition will cure completely at a temperature of about 125° C. to 170° C. in about two to three hours, to a solid state without undergoing substantially any volume shrinkage.

In order to indicate even more fully the nature of the hardenable, fluid compositions of the present invention, the following examples of suitable formulations are set forth. The parts given are by weight unless otherwise indicated.

EXAMPLE I

Part A

About 54 parts of sodium hydroxide are dissolved in about 600 parts of water in an open kettle provided with a mechanical stirrer. About 3 mols of bis-phenol "A" are added and the resultant mixture is stirred for about 10 minutes at a temperature of about 30° C. Thereafter, approximately 4 mols of epichlorohydrin are added, whereupon the temperature of the resultant mixture increases to about 60° C. to 70° C. due to the heat of reaction. About 42 parts of caustic soda dissolved in about 9 parts of water are then added with continuous stirring and the mixture is maintained at a temperature of about 90° C. to 100° C. for a period of about one hour. The mixture then is permitted to separate into two layers. The upper layer is withdrawn and discarded and the lower layer is washed with boiling water to which may be added acetic acid in an amount sufficient to neutralize unreacted caustic soda. A liquid resinous reactive polymeric epoxide is obtained after substantially all of the wash water has been removed.

Part B

A hardenable, fluid composition is prepared by admixing 0.7 part of a bentonite-amine reaction product prepared from a Wyoming bentonite "D" as indicated above and 4.5 parts of dicyandiamide with about 100 parts of the resinous polymeric epoxide prepared in part A of this example. The mixture is passed through a three-roll paint mill until a homogeneous product of smooth consistency is obtained. Thereafter, about 400 additional parts of the resinous polymeric epoxide prepared in Part A of this example are introduced into the mass and thoroughly admixed therewith to yield a homogeneous product. The product may be stored for long periods of time at room temperature without separation of the components and without converting to a solid. It cures completely to a solid homogeneous state without undergoing any substantial volume shrinkage upon heating at a temperature of 150° C. for two and one-half hours.

Examples of other suitable formulations combined in a way similar to that described in Example I include:

EXAMPLE II

|  | Parts |
|---|---|
| Resinous polymeric epoxide | 600 |
| Kaolin | 50 |
| Calcium carbonate | 150 |
| Phthalic anhydride | 40 |
| Bentonite-amine reaction product "D" | 10 |

EXAMPLE III

|  | Parts |
|---|---|
| Resinous polymeric epoxide | 450 |
| Wood flour | 30 |
| Calcium carbonate | 470 |
| Triethanolamine borate | 55 |
| Bentonite-amine reaction product "D" | 15 |

EXAMPLE IV

|  | Parts |
|---|---|
| Resinous polymeric epoxide | 550 |
| Calcium carbonate | 200 |
| Titanium dioxide | 100 |
| Asbestos fibers | 50 |
| Iron oxide | 100 |
| Maleic anhydride | 60 |
| Bentonite-amine reaction product "D" | 8 |

EXAMPLE V

A composition containing a major amount of filler is prepared using the following materials.

|  | Parts |
|---|---|
| Resinous polymeric epoxide | 100 |
| Calcium carbonate | 225 |
| Dicyandiamide | 10 |
| Bentonite-amine reaction product "D" | 0.5 |

All the bentonite-amine reaction product "D" and the dicyandiamide and about 20 parts of the epoxide are admixed and passed through a three-roll paint mill until a homogeneous product of smooth consistency is obtained. Thereafter, the remaining 80 parts of the epoxide and the 225 parts of calcium carbonate are introduced into the pasty mass and thoroughly admixed therewith to yield a homogeneous pasty product. The product retains its pasty consistency even when stored for relatively long periods of time without the catalyst settling out. It cures completely on heating to a solid homogeneous state without undergoing any substantial volume shrinkage.

The hardenable, fluid compositions of the present invention have properties and characteristics which render them suitable for many uses. Thus, the compositions cure completely to a solid homogeneous state without undergoing substantial volume shrinkage, they have high resistance to attack by chemicals, they resist moisture penetration, and they are extremely adherent to metals. These properties and characteristics make the compositions of the present invention particularly well suited for use as potting materials in the manufacture of transformers and electronic equipment, as a cement for filling the air gaps of fluorescent ballast transformers, and as end winding insulation for motors.

While the present invention has been described with reference to particular examples and embodiments, it will be understood, of course, that many changes, substitutions, and modifications may be made therein without departing from its true scope.

I claim as my invention:

1. A hardenable, fluid composition comprising a glycidyl polyether of a polyhydric phenol having a 1,2-epoxy equivalency between 1 and 2 and which is devoid of other reactive substituents than phenolic hydroxyl groups, a catalyst which is insoluble in said glycidyl polyether, said catalyst being present in an amount within the range of 6% to 50% by weight for each 100 parts by weight of said glycidyl polyether, and a bentonite-amine reaction product in an amount sufficient to maintain the catalyst in suspension in said glycidyl polyether whereby the glycidyl polyether may be converted completely to a solid homogeneous state without undergoing substantial volume shrinkage, said bentonite-amine reaction product being present in an amount within the range of from 0.1% to 15% by weight for each 100 parts by weight of the glycidyl polyether.

2. The composition of claim 1, admixed with up to 300 parts by weight of finely divided filler.

3. In the process of converting a fluid composition comprising a glycidyl polyether of a polyhydric phenol having a 1,2-epoxy equivalency between 1 and 2 and which is devoid of other reactive substituents than phenolic hydroxyl groups to a solid state by heating the same in the presence of an insoluble catalyst therefor the improvement which comprises carrying out the conversion in the presence of an amount of a bentonite-amine reaction product sufficient to maintain the catalyst in suspension in the glycidyl polyether whereby the glycidyl polyether is converted completely to a solid homogeneous state without undergoing substantial volume shrinkage.

4. An article of manufacture comprising a casing having disposed therein a flexible, hard cured normally liquid resinous glycidyl polyether of a polyhydric phenol having a 1,2-epoxy equivalency of between 1 and 2 which is devoid of other reactive substituents than phenolic hydroxyl groups, and a bentonite-amine reaction product.

5. An article of manufacture as set forth in claim 4 in which said bentonite-amine reaction product is present in an amount within the range of from 0.1% to 15% by weight for each 100 parts by weight of the resinous glycidyl polyether.

6. The process which comprises introducing into a casing a hardenable, fluid composition comprising a normally liquid resinous glycidyl polyether of a polyhydric phenol having a 1,2-epoxy equivalency of between 1 and 2 and which is devoid of other reactive substituents than phenolic hydroxyl groups, a catalyst which is insoluble in the glycidyl polyether, said catalyst being present in an amount within the range of 6% to 50% by weight for each 100 parts by weight of the glycidyl polyether, and a bentonite-amine reaction product in an amount within the range of from 0.1% to 15% by weight for each 100 parts by weight of the glycidyl polyether, and heating the fluid composition while the same is in the casing to convert the composition completely to a solid homogeneous state without undergoing substantial volume shrinkage.

7. The composition of claim 1 wherein the catalyst is dicyandiamide.

8. The process of claim 3 wherein the catalyst is dicyandiamide.

9. The process of claim 6 wherein the catalyst is dicyandiamide.

References Cited in the file of this patent

UNITED STATES PATENTS

| | | |
|---|---|---|
| 2,500,600 | Bradley | Mar. 14, 1950 |
| 2,531,427 | Hauser | Nov. 28, 1950 |